United States Patent [19]

Dona

[11] Patent Number: 5,381,285
[45] Date of Patent: Jan. 10, 1995

[54] BEARING ARRANGEMENT, DEVICE WITH ROTATABLE DISC, AND MAGNETIC-TAPE APPARATUS

[75] Inventor: Marinus J. J. Dona, Eindhoven, Netherlands

[73] Assignee: U.S. Philips Corporation, New York, N.Y.

[21] Appl. No.: 240,194

[22] Filed: May 9, 1994

Related U.S. Application Data

[63] Continuation of Ser. No. 876,849, Apr. 30, 1992, abandoned.

[30] Foreign Application Priority Data

Jul. 5, 1991 [EP] European Pat. Off. .......... 91201738

[51] Int. Cl.6 .................... G11B 5/027; G11B 17/08; F16C 23/04
[52] U.S. Cl. .................... 360/98.07; 360/84; 360/107; 384/193; 384/202; 310/67 R
[58] Field of Search ............. 360/84, 98.07, 99.08, 360/107; 384/104, 240, 446, 536, 107, 192, 193, 194, 202; 57/92, 104, 406; 310/67 R, 90, 90.5

[56] References Cited

U.S. PATENT DOCUMENTS

| | | | |
|---|---|---|---|
| 3,977,659 | 8/1976 | Kraizinger et al. | 266/245 |
| 4,053,034 | 10/1977 | Katzer | 384/202 |
| 4,132,414 | 1/1979 | Dinsdale | 274/39 |
| 4,167,845 | 9/1979 | Munnich et al. | 57/104 |
| 4,186,548 | 2/1980 | Stahlecker | 384/240 |
| 4,519,010 | 5/1985 | Elsaesser et al. | 360/98.07 |
| 4,558,869 | 12/1985 | Grove et al. | 277/1 |
| 4,706,143 | 11/1987 | Asada et al. | 360/107 |
| 4,706,144 | 11/1987 | Asada et al. | 360/84 |
| 4,783,608 | 11/1988 | Gruber et al. | 310/67 R |
| 4,922,406 | 5/1990 | Schuh | 360/98.07 |
| 4,965,476 | 10/1990 | Lin | 310/67 R |
| 4,984,116 | 1/1991 | Hescher et al. | 360/84 |
| 5,161,901 | 10/1992 | Dona et al. | 384/192 |

FOREIGN PATENT DOCUMENTS

| | | | |
|---|---|---|---|
| 2045675 | 3/1972 | Germany | 384/192 |
| 61-104417 | 5/1986 | Japan | 360/84 |
| 1112284 | 9/1984 | U.S.S.R. | 384/193 |

Primary Examiner—A. J. Heinz
Assistant Examiner—Jefferson Evans
Attorney, Agent, or Firm—William L. Botjer

[57] ABSTRACT

A bearing arrangement (15), in particular for a device (1) with a rotatable disc or a magnetic-tape apparatus (101) has a shaft (19) which is connected to an auxiliary member (23) via a hinge (21). The shaft (19) is radially supported and the auxiliary member (23) is axially supported. As a result of the connection via a hinge (21) the auxiliary member (23) can align itself without the alignment of the shaft (19) being influenced, so that the requirement imposed on the accuracy of the bearing surfaces of the shaft (19) relative to the bearing surfaces of the auxiliary member (23) can be less stringent.

13 Claims, 4 Drawing Sheets

BEARING ARRANGEMENT, DEVICE WITH ROTATABLE DISC, AND MAGNETIC-TAPE APPARATUS

This is a continuation of application Ser. No. 07/876,849, filed Apr. 30, 1992, now abandoned.

BACKGROUND OF THE INVENTION

The invention relates to a bearing arrangement comprising a shaft, an auxiliary member and a housing, which shaft is secured to the auxiliary member, the shaft being radially supported and the auxiliary member being axially supported in the housing.

The invention also relates to a rotatable-disc device comprising two parts which are rotatable relative to one another, one part being constituted by a stationary chassis and the other part being constituted by a rotatable hub carrying the disc, one of said parts comprising a shaft and the other part comprising a housing, which shaft is secured to the auxiliary member, the shaft being radially supported and the auxiliary member being axially supported in the housing.

The invention further relates to a magnetic-tape apparatus comprising a stationary drum and a rotatable drum provided with at least one magnetic head, one of said drums having a shaft and an auxiliary member and the other drum having a housing, which shaft is secured to the auxiliary member, the shaft being radially supported and the auxiliary member being axially supported in the housing.

A bearing arrangement of the type defined in the opening paragraph is known from DE 25 37 758 C2. In this prior-art bearing arrangement the shaft is radially supported by means of a spiral-groove bearing and the auxiliary member is constituted by a free shaft end which forms a rigid unit with the shaft and is formed with spiral grooves for the axial support. For a correct bearing construction such an arrangement requires that for the axial support one wall of the shaft end extends perpendicularly to the cylindrical wall of the shaft and that a cylindrical inner wall of the housing extends perpendicularly to a bottom wall of the housing. If these requirements are not met the clearance between the walls forming the axial bearing structure will not be uniform, which may give rise to local contact between the two walls, which is undesirable. As a result of said requirements the costs of manufacturing the prior-art bearing arrangement will be comparatively high and the axial bearing construction will not always be optimum because of the inevitable manufacturing tolerance on the perpendicularity of the walls.

SUMMARY OF THE INVENTION

It is one of the objects of the invention to provide a bearing arrangement which can be manufactured simply, resulting in low manufacturing costs and an optimum axial bearing construction. To this end the bearing arrangement in accordance with the invention is characterised in that the shaft is secured to the auxiliary member via a hinge, the hinge being axially rigid. In this way the axial bearing structure is isolated from the radial bearing structure and the axial bearing structure is self-aligning, so that the bearing surfaces are always parallel and, consequently, a uniform bearing clearance is obtained. This construction does not impose stringent requirements on the perpendicularity of the bearing surfaces so that the manufacturing costs are low. Since with the construction in accordance with the invention the bearing the axial bearing clearance is substantially uniform the power dissipation will be smaller than in the case of a non-uniform clearance.

An embodiment of the bearing arrangement in accordance with the invention, in which the auxiliary member has two parallel transverse walls which extend at least substantially perpendicularly to the central axis of the shaft, and in which the housing has two further parallel transverse walls which extend at least substantially perpendicularly to the central axis of the shaft, is characterised in that each transverse wall faces a further transverse wall and a bearing is provided between each transverse wall and further transverse wall. This inhibits displacement of the auxiliary member in both axial directions, so that the axial shaft position is constant. In the prior-an bearing arrangement shaft displacement is impossible in only one axial direction and the bearing clearance of the axial spiral groove bearing may increase as the rotational frequency increases, causing an undesirable axial displacement of the shaft.

A further embodiment of the bearing arrangement in accordance with the invention is characterised in that the shaft and the auxiliary member are supported by means of spiral groove bearings. If the spiral-groove bearings are used the perpendicularity requirement is even more stringent because spiral-groove bearings, in contrast with ball-bearings, cannot align themselves if the bearing surfaces are not parallel. As a result of this the construction in accordance with the invention is even more advantageous in the case of a bearing arrangement employing spiral-groove bearings.

Yet another embodiment of the bearing arrangement in accordance with the invention is characterised in that the hinge is constituted by a flexible joint. The flexible joint is axially rigid, which inhibits axial displacement of the shaft. The flexible joint enables the shaft to be tilted relative to the auxiliary member, thereby allowing the auxiliary member to align without the shaft-bearing arrangement being influenced.

Still another embodiment of the bearing arrangement in accordance with the invention, in which the outer wall of the auxiliary member exhibits an axial wobble of only a few micrometers, is characterised in that the flexible joint is constituted by a shaft portion of reduced diameter. In this construction the shaft, the joint and the auxiliary member form an integral unit, which can be manufactured at low cost. Even in the case of a slight reduction in shaft diameter near the auxiliary member the flexibility will be adequate because the pivotal movement is of the order of micrometers.

According to the invention the device with a rotatable disc comprises two parts which are rotatable relative to one another, one pan being constituted by a stationary chassis and the other part being constituted by a rotatable hub carrying the disc, one of said pans comprising a shaft and the other part comprising a housing, which shaft is secured to the auxiliary member, the shaft being radially supported and the auxiliary member being axially supported in the housing, the shaft being secured to the auxiliary member via a hinge, and the hinge being axially rigid.

The magnetic-tape apparatus in accordance with the invention comprises a stationary drum and a rotatable drum provided with at least one magnetic head, one of said drums having a shaft and an auxiliary member and the other drum having a housing, which shaft is secured to the auxiliary member, the shaft being radially supported and the auxiliary member being axially supported in the housing, the shaft being secured to the auxiliary member via a hinge, and the hinge being axially rigid.

BRIEF DESCRIPTION OF THE DRAWING

The invention will now be described in more detail, by way of example, with reference to the drawings. In the drawings.

DETAILED DESCRIPTION OF THE PREFERRED EMBODIMENT

Figure 1:
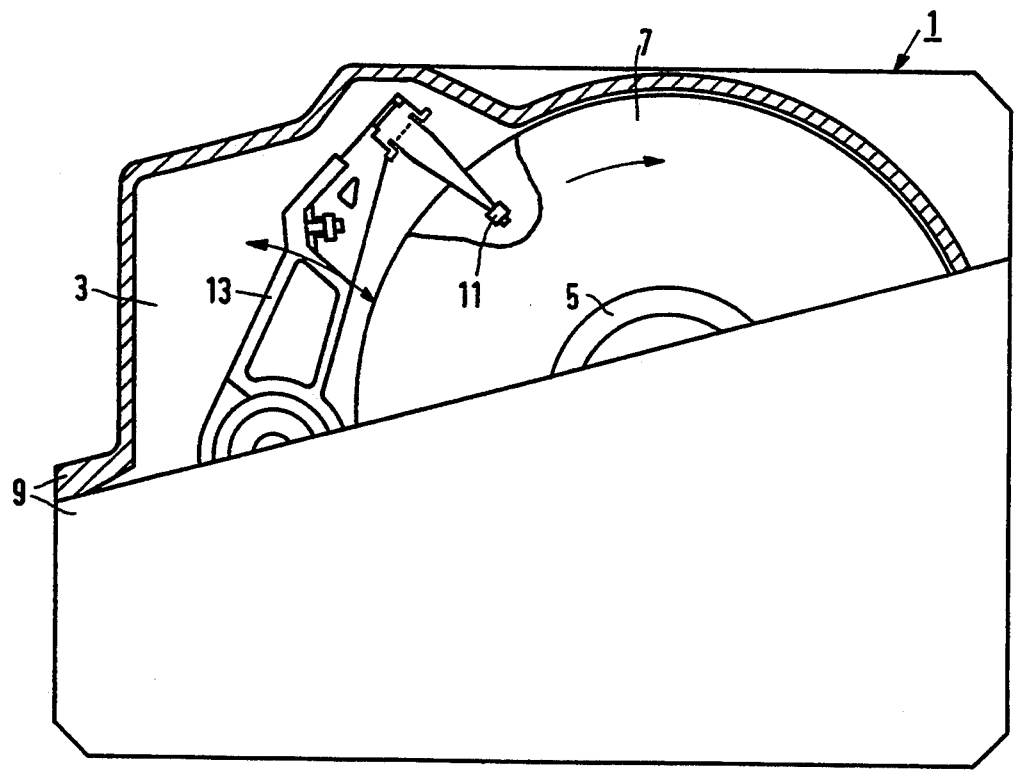
FIG. 1 shows a rotatable-disc data-storage device.

FIG. 1 shows a rotatable-disc data-storage device 1. The data-storage device 1 has two parts 3, 5 which are rotatable relative to one another. One of these parts is formed by a chassis 3 and the other part is formed by a rotatable hub 5. The hub 5 carries a plurality of rotatable data-storage discs 7. The chassis 5 is connected to a housing 9 which accommodates the hub 5 with the discs 7 and a plurality of magnetic heads 11 secured to pivotable arms 13.

Figure 2:
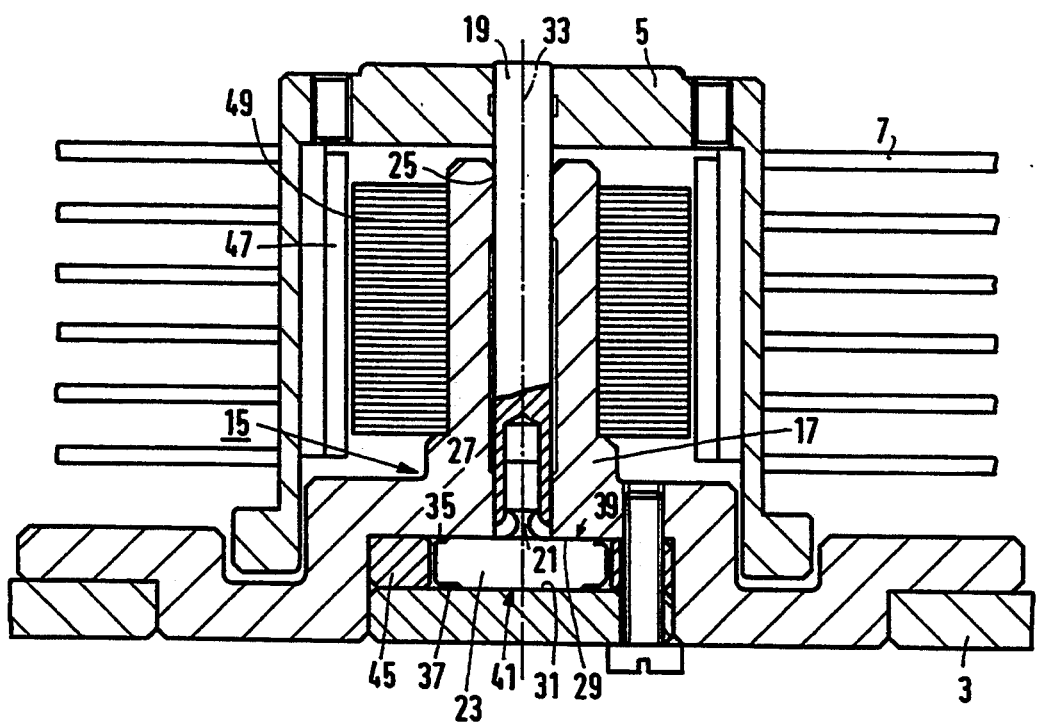
FIG. 2 is a sectional view of a beating arrangement in accordance with the invention used in the device shown in FIG. 1.
Figure 3:
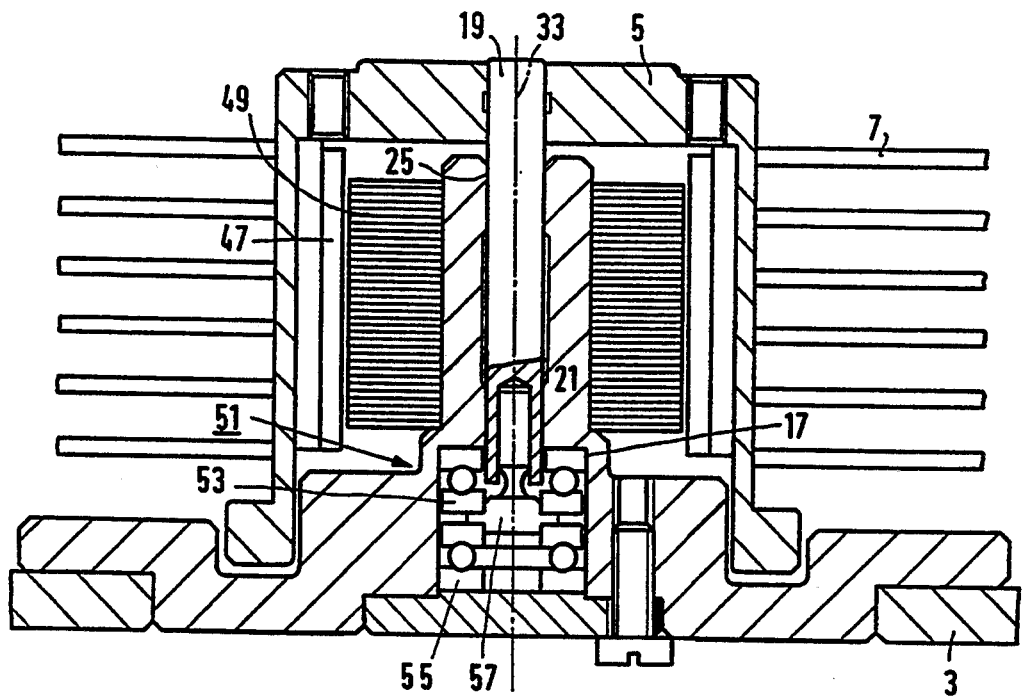
FIGS. 3 to 7 show further embodiments of the bearing arrangement in accordance with the invention.

The hub 5 is connected to the chassis 3 of the data-storage device 1 via a bearing arrangement 15, see FIG. 2. The bearing arrangement 15 comprises a housing 17 and a shaft 19 connected to an auxiliary member 23 via a hinge 21. The hinge is constituted by a flexible joint 21 formed by shaft portion of reduced diameter, so that the joint is rigid in the axial direction of the shaft 19 and allows the shaft 19 to be tilted relative to the auxiliary member 23. The shaft 19 is radially supported in the housing 17 by means of bearings 25, 27 in the form of spiral-groove bearings, the inner wall of the housing 17 being formed with bearing grooves. The auxiliary member 23 is axially supported in the housing 17. The auxiliary member 23 has two parallel transverse walls 29, 31, which each extend at least substantially perpendicularly to the central axis 33 of the shaft 19. The housing 17 further comprises two parallel transverse walls 35, 37, which also extend at least substantially perpendicularly to the central axis 33 of the shaft 19. A bearing 39 is situated between the transverse wall 29 and the further transverse wall 35 and a bearing 41 is situated between the transverse wall 31 and the further transverse wall 37. The bearings are constructed as spiral-groove bearings, the bearing grooves being situated in the further transverse walls 35, 37 of the housing 17. The further transverse wall 37 is constituted by a cover 43 of the housing 17 and is spaced from the further transverse wall 35 by a spacer 45. An electric motor is arranged between the hub 5 and the housing 17 in order to drive the hub 5 relative to the chassis 3, which motor comprises permanent magnets 47 situated in the hub 5 and windings 49 situated on the housing 17.

Figure 4:
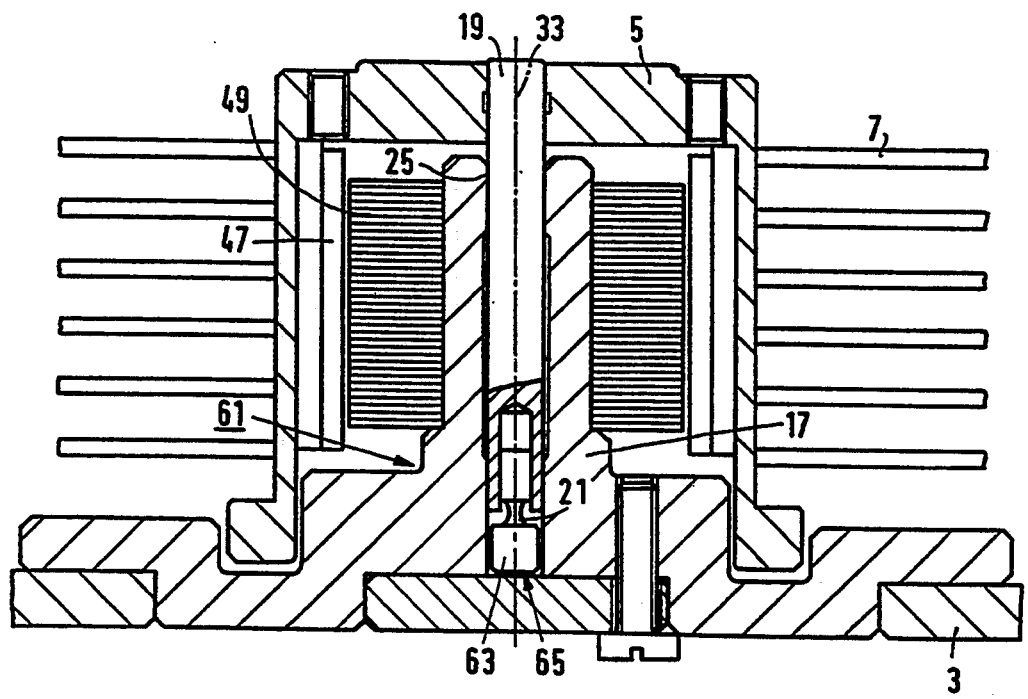
Figure 5:
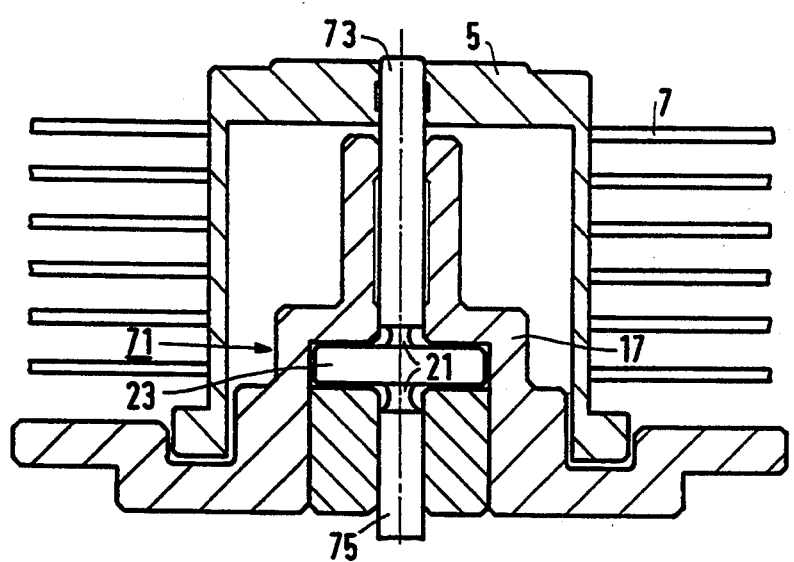
Figure 6:
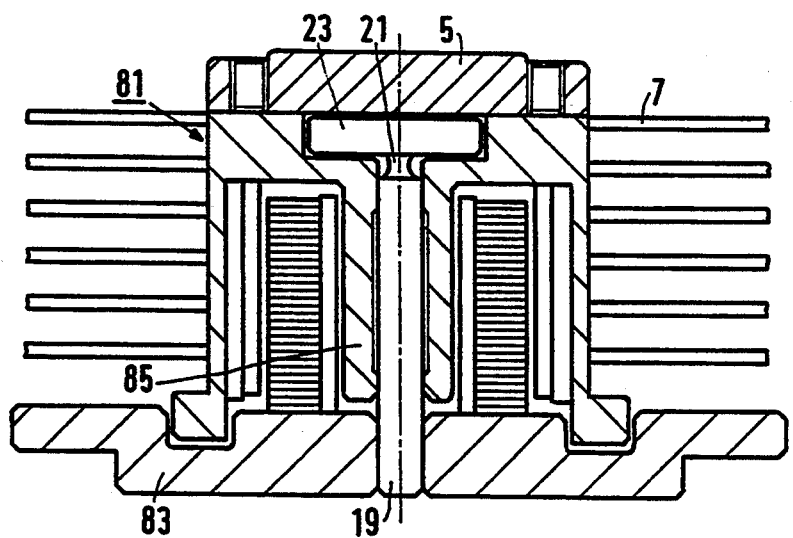
Figure 7:
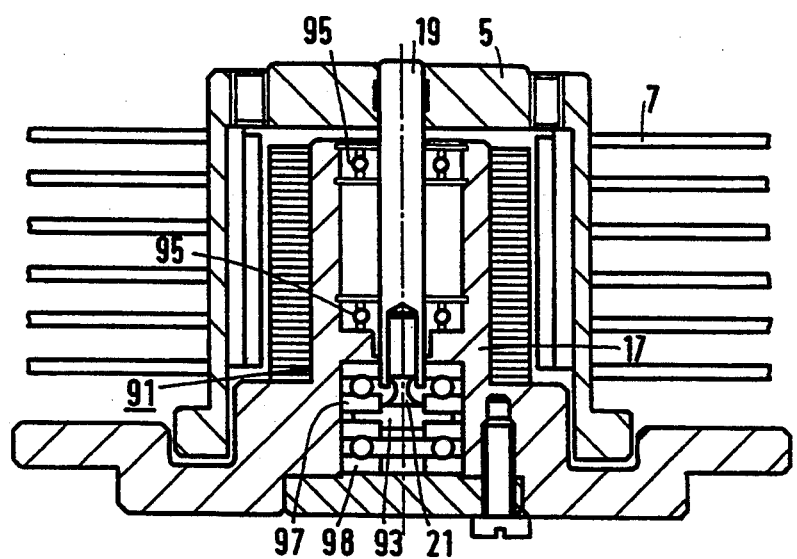

FIGS. 3 to 7 show further embodiments of the bearing arrangement in accordance with the invention. In these Figures pans corresponding to pans of the construction shown in FIG. 2 bear the same reference numerals. In the bearing arrangement 51 shown in FIG. 3 the axial bearings are ball-bearings 53 and 55, which retain the auxiliary member 57 in the axial direction. The diameter of the auxiliary member 63 of the bearing arrangement 61 shown in FIG. 4 is smaller than the diameter of the shaft 19. As a result of this, only one axial bearing 65 is needed and the shaft 19 with the auxiliary member 63 can move freely in one of the axial directions. In the bearing arrangement 71 shown in FIG. 5 the auxiliary member 23 is situated between two shaft sections 73 and 75. This enables the electric motor to be arranged outside the hub 5 underneath the chassis. In the bearing arrangement 81 shown in FIG. 6 the shaft 19 with the auxiliary member 23 is stationary and the shaft 19 is connected to the chassis via an intermediate member 83. The housing 85, which is rotatable about the shaft 19, is secured to the chassis 5. In the bearing arrangement 91 shown in FIG. 7 both the radial bearing construction for the shaft 19 and the axial bearing construction for the auxiliary member 93 are constituted by ball-bearings 95, 96, 97 and 98.

Figure 8:
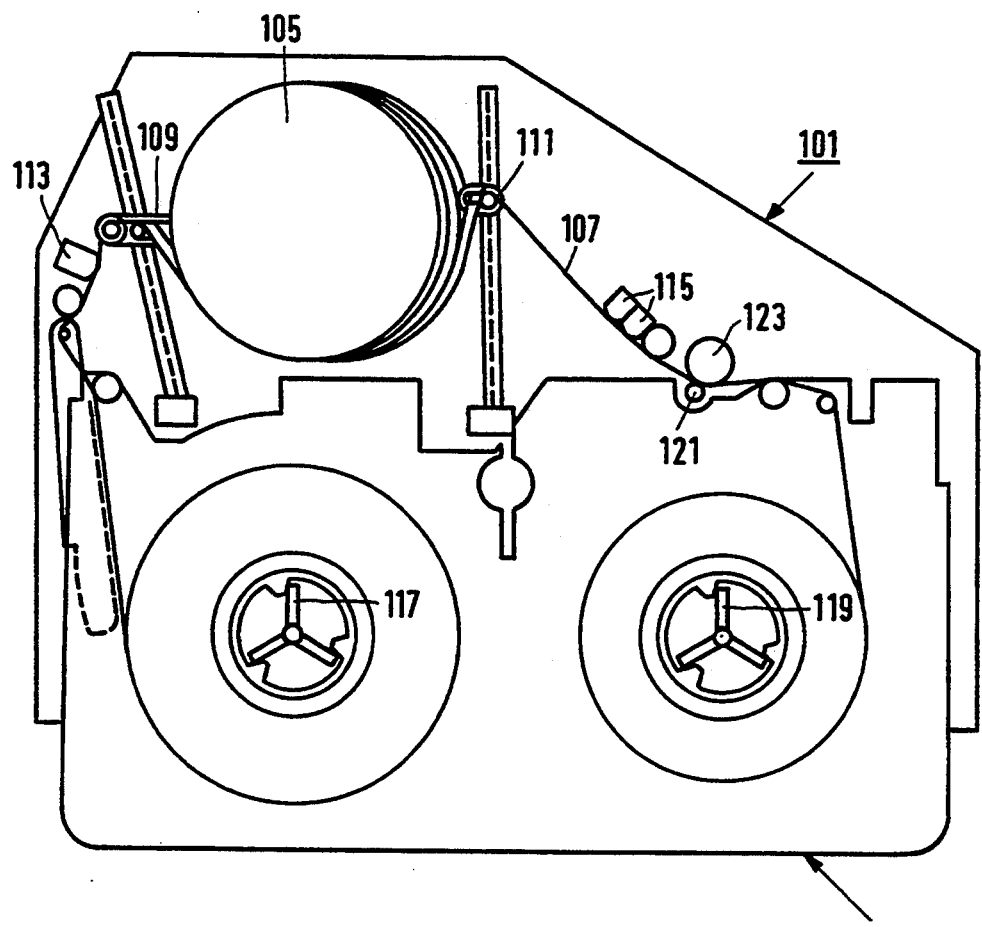
FIG. 8 shows a deck of a magnetic-tape apparatus with a magnetic-tape cassette.
Figure 9:
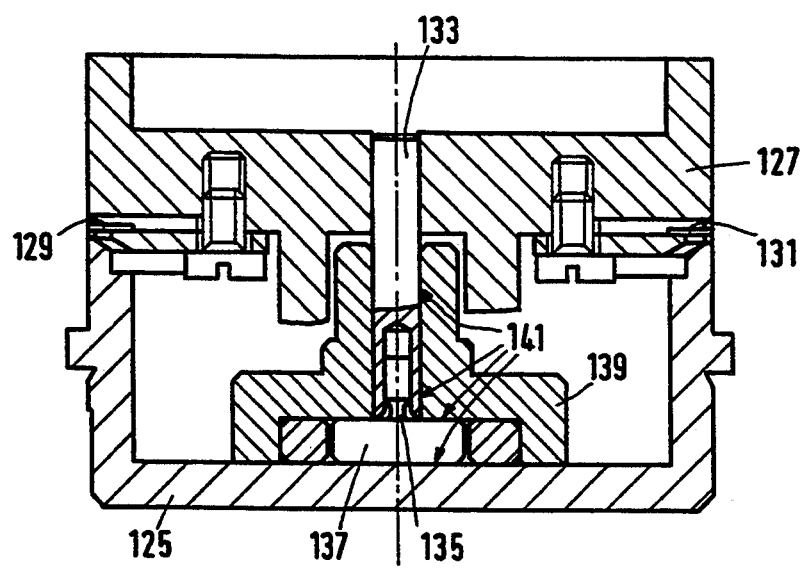
FIG. 9 is a sectional view of a scanning unit of the magnetic-tape apparatus.

The bearing arrangement in accordance with the invention can also be used in other apparatuses. FIG. 8 shows an example of this in the form of a magnetic-tape apparatus 101 which cooperates with a magnetic-tape cassette 103. The magnetic-tape apparatus 101 comprises a scanning unit 105, for reading and writing information in inclined tracks on a magnetic tape 107, and movable tape-threading means 109, 111 for extracting the magnetic tape 107 from the magnetic-tape cassette 103 and wrapping the magnetic tape around the scanning unit 105. The magnetic-tape apparatus further comprises stationary magnetic heads 113 and 115 for erasing information and reading and writing auxiliary information on the magnetic tape and means for transport of the magnetic tape, which means comprise reel-drive spindles 117, 119, a capstan 121 and a pressure roller 123. The scanning unit 105 has a stationary drum 125 and a rotatable drum 127 to which magnetic heads 129, 131 are secured, see FIG. 9. A shaft 133 is secured to the drum 127 and is connected to an auxiliary member 137 via a hinge 135. The shaft with the auxiliary member is journalled in a housing 139 connected to the drum 125 by means of spiral-groove bearings 141. The stationary drum 125 further accommodates an electric motor, not shown, for driving the drum 127.

Although in the foregoing the invention has been described with reference to the drawings, it is to be noted that the invention is by no means limited to the embodiments shown in the drawings. The invention also pertains to all embodiments deviating from those in the drawings within the scope defined by the Claims. For example, in deviation from what is shown in the drawings, it is possible to construct the hinge as a ball joint or to form the flexible joint by a thinner portion of the shaft at the location where it is connected to the auxiliary member. The bearing arrangement in accordance with the invention can also be used advantageously in other apparatuses than shown herein, for example for a shaft of an electric motor.

I claim:

1. A bearing arrangement comprising a rotatable shaft having a central axis, an auxiliary member and a housing, which shaft is secured to the auxiliary member, the shaft being radially supported only and the auxiliary member being axially supported only in the housing, the shaft being secured to the auxiliary member by a hinge, the hinge being axially rigid so as to prevent relative axial displacement between the shaft and the auxiliary member while permitting small angular displacements therebetween.

2. A bearing arrangement as claimed in claim 1, in which the auxiliary member has two parallel transverse walls which extend at least substantially perpendicularly to the central axis of the shaft, and in which the housing has two parallel transverse walls which extend at least substantially perpendicularly to the central axis of the shaft, wherein each transverse wall of the auxiliary member faces a transverse wall of the housing and a bearing is provided therebetween.

3. A bearing arrangement as claimed in claim 2, wherein the shaft and the auxiliary member are supported by means of spiral-groove bearings.

4. A bearing arrangement as claimed in claim 2, characterized in that the hinge is constituted by a flexible joint.

5. A bearing arrangement as claimed in claim 4, characterized in that the flexible joint is constituted by a shaft portion of reduced diameter.

6. A bearing arrangement as claimed in claim 1, characterised in that the hinge is constituted by a flexible joint.

7. A bearing arrangement as claimed in claim 6, wherein the flexible joint is constituted by a shaft portion of reduced diameter.

8. A rotatable-disc device comprising two parts which are rotatable relative to one another, one part being constituted by a stationary chassis and the other part being constituted by a rotatable hub carrying the disc, one of said parts comprising a rotatable shaft having a central axis and the other part comprising a housing, which shaft is secured to an auxiliary member, the shaft being radially supported only and the auxiliary member being axially supported only in the housing, the shaft being secured to the auxiliary member by a hinge, the hinge being axially rigid so as to prevent relative axial displacement between the shaft and the auxiliary member while permitting small angular displacements therebetween.

9. A device as claimed in claim 8, in which the auxiliary member has two parallel transverse walls which extend at least substantially perpendicularly to the central axis of the shaft, and in which the housing has two parallel transverse walls which extend at least substantially perpendicularly to the central axis of the shaft, each transverse wall of the auxiliary member facing a transverse wall of the housing and a bearing being provided therebetween.

10. A bearing arrangement as claimed in claim 8, characterized in that the hinge is constituted by a flexible joint.

11. A bearing arrangement as claimed in claim 10, characterized in that the flexible joint is constituted by a shaft portion of reduced diameter.

12. A magnetic-tape apparatus comprising a stationary drum and a rotatable drum provided with at least one magnetic head, one of said drums having a shaft having a central axis and an auxiliary member and the other drum having a housing, which shaft is secured to the auxiliary member, the shaft being radially supported only and the auxiliary member being axially supported only in the housing, the shaft being secured to the auxiliary member by a hinge, the hinge being axially rigid so as to prevent relative axial displacement between the shift and the auxiliary member while permitting small angular displacements therebetween.

13. A magnetic-tape apparatus as claimed in claim 12, in which the auxiliary member has two parallel transverse walls which extend at least substantially perpendicularly to the central axis of the shaft, and in which the housing has two parallel transverse walls which extend at least substantially perpendicularly to the central axis of the shaft, each transverse wall of the auxiliary member facing a transverse wall of the housing and a bearing being provided therebetween.

* * * * *